United States Patent [19]
Dudley

[11] 3,971,114
[45] July 27, 1976

[54] MACHINE TOOL HAVING INTERNALLY ROUTED CRYOGENIC FLUID FOR COOLING INTERFACE BETWEEN CUTTING EDGE OF TOOL AND WORKPIECE

[76] Inventor: George M. Dudley, 69 N. Boxwood St., Hampton, Va. 23369

[22] Filed: Jan. 27, 1972

[21] Appl. No.: 221,322

[52] U.S. Cl. .................................. 29/106; 82/1 R
[51] Int. Cl.² ...................... B26D 1/00; B23B 3/00
[58] Field of Search ............... 29/106; 83/170, 171; 82/1

[56] References Cited
UNITED STATES PATENTS

| 160,161 | 2/1875 | Clay | 29/106 |
|---|---|---|---|
| 2,067,676 | 1/1937 | Lees | 29/106 |
| 2,524,232 | 10/1950 | Ohsrud | 29/106 R |
| 2,785,457 | 3/1957 | Pigott | 29/106 |
| 2,851,764 | 9/1958 | White | 29/106 |
| 3,077,802 | 2/1963 | Philip | 29/106 R |
| 3,570,332 | 3/1971 | Beake | 29/106 |
| 3,571,877 | 3/1971 | Zerkle | 29/106 R |
| 3,577,808 | 4/1971 | Visser | 83/171 |
| 3,605,551 | 9/1971 | Steward | 83/171 |

FOREIGN PATENTS OR APPLICATIONS

| 749,457 | 5/1956 | United Kingdom | 29/106 |

Primary Examiner—Harrison L. Hinson
Attorney, Agent, or Firm—Howard J. Osborn; John R. Manning

[57] ABSTRACT

This machine tool is utilized for cutting super alloys. The tool is associated with a source of cryogenic coolant which is routed internally through the tool. The coolant is discharged from the tool at a precise angle such that the stream of the coolant at the interface between the tool cutting edge and the workpiece is such that the chip cutting from the piece does not interfere with the coolant stream. The coolant passage is insulated to prevent boiling of the coolant until it reaches the cutting edge to obtain maximum heat dissipation.

2 Claims, 6 Drawing Figures

MACHINE TOOL HAVING INTERNALLY ROUTED CRYOGENIC FLUID FOR COOLING INTERFACE BETWEEN CUTTING EDGE OF TOOL AND WORKPIECE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to machine tools and has particular utility in designing machine tools to operate efficiently and effectively on workpieces consisting of all machinable metals. The invention embodies an effective means of cooling a machine tool at the interface between the cutting edge and the workpiece to reduce machining time and provide an acceptable end product.

2. Description of the Prior Art

The use of cutting fluids as a coolant for application to the cutting edge of a machine tool and/or the metal workpiece in order to increase the cutting rate and tool life, and to provide an acceptably finished workpiece is known in the art. One such prior art method is to flood the region of the machine tool cutting edge and workpiece with a coolant such as water soluble oil. The cooling effect of such a coolant, however, is often unacceptable. Further, this prior art method results in other disadvantages such as bad odor, water evaporation on the machine and tools leaving a scum surface thereon, and certain health and sanitary problems. The McLean U.S. Pat. No. 3,129,182 discloses the use as a cutting fluid of a mixture of a Freon and butyl Cellosolve in the machining of parts. The fluid is applied in a mist by simple spray and/or air jet application equipment which is external to the machine tool. An example of typical external equipment for this purpose is shown in West, Jr., U.S. Pat. No. 2,635,399 wherein a coolant such as carbon dioxide or other liquefied gas is externally directed in a stream toward the area of contact between the tool and an abrasive grinding surface.

The White U.S. Pat. No. 2,851,764 discloses an externally mounted source of a high pressure stream of cutting liquid which is forced by the ultrasonic alternating pressure present in the stream into contact with the tool cutting edge through the extremely small clearance between the tool and the workpiece to provide lubrication of the tool-chip interface. The White device uses a pump and a resonator chamber to cause the stream to strike the tool-chip interface with considerable force and requires rather complicated adjustment of the transducer system employed.

Benjamin U.S. Pat. No. 3,364,800 relates to a spade drill having means for creating a mist coolant adjacent the cutting edges thereof. The spade drill comprises several internally routed coolant tubes in the chuckhead through which coolant is directed. The internal passageways are specifically disclosed as having re-mister plugs for vaporizing any liquid-air mixture passing therethrough because the Benjamin device operates upon the basis that a mist coolant is able to penetrate into cutting areas not accessible by liquids. Thus Benjamin requires use of a spray mist and the precise aiming of the mist at the work/blade interface is not critical. The DuPont Bulletin No. FS-18 entitled "Freon T-B1 Cutting Fluid" illustrates a hollow drill for delivery of a spray mist comprising Freon, but cautions that this may be more effective than external delivery only in cases where chips are not an obstructing factor. Thus both this drill and the Benjamin drill do not solve the problem of cooling the interface between a machine tool and the workpiece when chips are an obstructing factor.

SUMMARY OF THE DISCLOSURE

These and other disadvantages of the prior art discussed above are solved by the instant invention wherein a cryogenic coolant is transported to the region of the interface between the cutting edge of the machining tool and the metal workpiece through a conduit internal to the machining tool and is delivered to the interface in such manner that the cutting chips do not obstruct or interfere with the coolant stream. The routing of the coolant internally through the machine tool to the region of the cutting edge below the cutting chips enables prolonged operation without tool resharpening, as well as sharper cuts with even very hard metals such as superalloys, for example: nickel and cobalt base alloys. Softer metals can be cut according to the invention at a faster rate compared to the prior art. Further, the described internal routing of the coolant eliminates the necessity of adjusting the coolant stream with relation to the workpiece. The coolant stream is automatically accurately directed, thus insuring effective cooling by proper design of the machine tool per se. The particular type of coolant utilized may for exemplary purposes comprise Freon-12, a commercial product manufactured by the DuPont Company, specific details relating thereto being provided in the above-cited DuPont Bulletin. However, other types of expandable gas cryogenic coolants, such as nitrogen, may also be used and the invention is not to be interpreted as limited only to the use of Freon-12.

DETAILED DESCRIPTION OF THE DISCLOSURE

Figure 1:
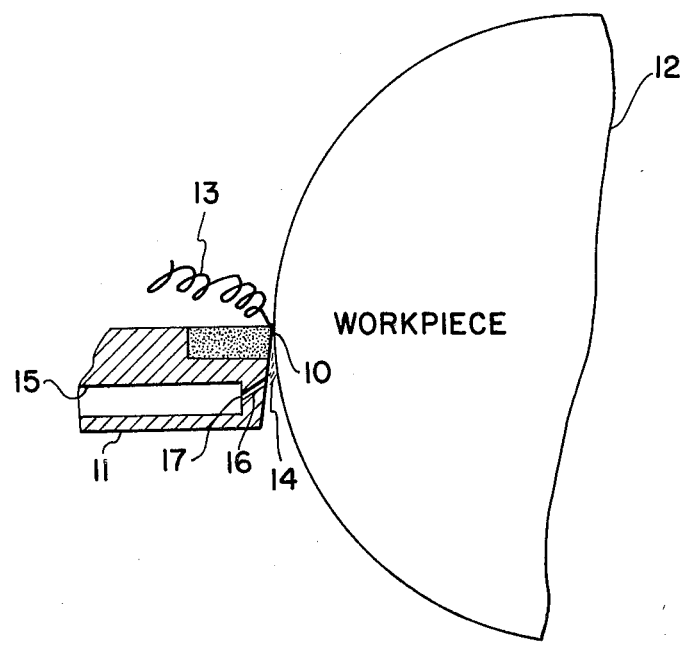
FIG. 1 is a partly sectional view of the tool/workpiece interface, illustrating the direction of the cutting chip and the routing of the coolant internally of the tool.

FIG. 1 of the drawings shows partially one embodiment of the machine tool according to the invention, wherein the cutting edge 10 of machine tool 11 is in cutting condition with respect to workpiece 12. Under the assumed counterclockwise direction of rotation of the workpiece, a cutting chip 13 will be produced at the interface between the cutting edge and the workpiece which will curl outwardly in the direction illustrated. The routing of the coolant internally through the machine tool will cause a stream of coolant 14 to be automatically directed to the region of the interface, in a direction such that the cutting chip 13 does not obstruct or interfere with the coolant stream 14. The coolant thus enters tube 15 and is routed through the tube, which is internal to the tool, for ejection to the region of the tool/workpiece interface through tube 16. Tube 16 is coupled to end 17 of tube 15 at an angle which causes the direction of ejection of the coolant to ensure noninterference by the cutting chip, and optimize cooling. Particular embodiments of the tool structure according to the invention are discussed in detail hereafter.

Figure 2:
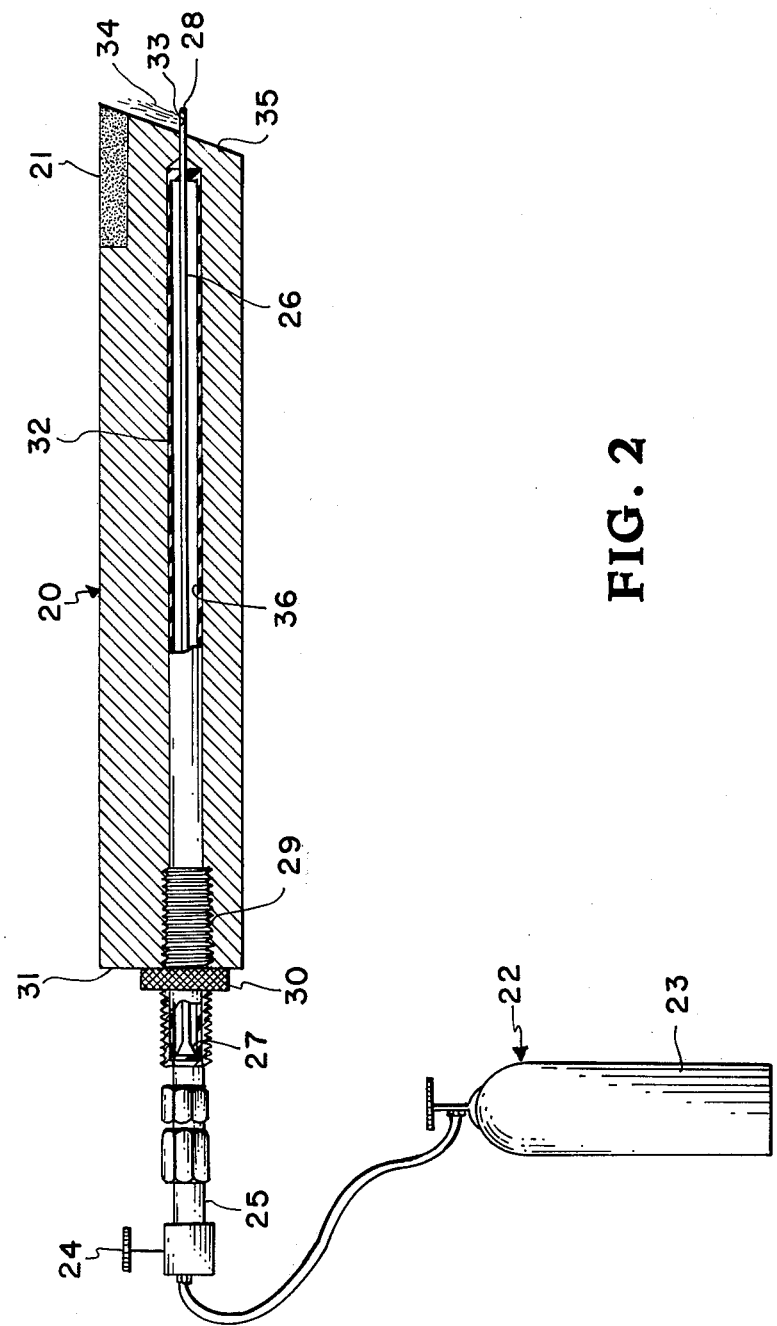
FIG. 2 is a partly sectional view of one embodiment of the tool according to the invention.

FIG. 2 shows a machine tool 20 defining a carbide tip 21 at one end thereof. A source of coolant supply 22 is provided which injects the coolant 23 under control of diaphragm valve 24 into tubular structure 25. Diaphragm valve 24 can be actuated to one position wherein it enables the flow of coolant, and another position wherein it shuts off the supply of coolant.

The interior of the tool defines a bore into which outer tubular structure 32 is fitted. Tubular structure 25 tapers inwardly near the entry 27 to the machine tool to define inner structure 26. The coolant enters the inner tubular structure at entry 27 and exits at the other end 28 thereof as explained hereafter. Outer tubular structure 32 surrounds inner tubular structure 26 and is insulated from the internal structure of the lathe tool by insulating material 32 in order that the coolant flowing through the inner tubular structure does not absorb heat from the tool structure and does not vaporize until it exits from the inner tubular structure as explained hereafter. Alternatively, the insulating material may be positioned in the void 36 defined by the inner and outer tubular structures. The insulating feature also includes a dead-air space, wherever the insulating material is located, which in itself functions as an insulator. The outer tubular structure defines a bolt-like threaded section 29 which intermates with nut 30 having an interfitting threaded bore (not shown). Nut 30 is in fixed position with end 31 of the tool, and rotation of nut 30 causes the outer tubular structure to be rotated, with the consequent result that it is moved into or out of the bore defined by the machine tool depending upon the direction of rotation of nut 30.

The cutting edge of the machine tool comprises a carbide tip 21. The inner tubular structure is closed at end 28, and a small aperture 33 is defined near the end 28 in order to direct the coolant in a stream 34 toward the interface of the cutting edge and the workpiece. The translation capability of the assembly as heretofore described wherein the assembly may be moved into or out of the machine tool is operative to fix the point at which the stream of coolant exits in order that it may be optimally directed at the interface. The diaphragm valve 24 may be manipulated to cut off the supply of coolant.

Figure 3A:
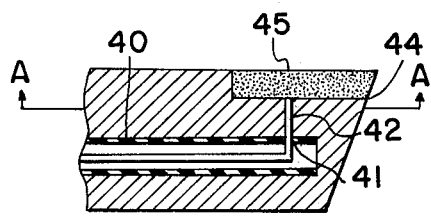
FIGS. 3a, 3b and 3c are partly sectional views of other embodiments of the tool according to the invention.
Figure 3B:
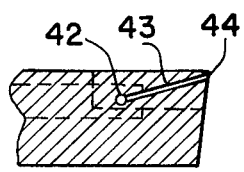

The FIG. 2 configuration of the invention shows the inner tubular structure as extending slightly outwardly from the end 35 of the machine tool nearest the cutting edge. FIG. 3a shows another embodiment of a tool according to the invention wherein outer tubular structure 40 is connected to the coolant supply and extends through a bore defined by the internal structure of the machine tool. The inner tubular structure is similar to that described with respect to FIG. 2. Aperture 41 defined by the outer tubular structure 40 connects the inner tubular structure with a first small drill hole 42. The section A—A view of FIG. 3b is taken through the top portion of the tool, with the carbide tip 45 removed, and illustrates channel 43 defined by the tool, which carries the coolant from the end of small drill hole 42 to the cutting edge at point 44, which is just below the carbide tip. The coolant stream is thus directed at the interface between the cutting edge of the tool and the workpiece from a position and direction directly below the carbide tip.

Figure 3C:
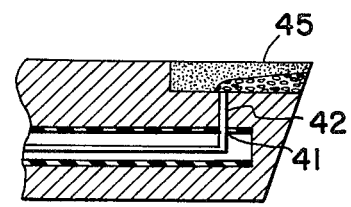

FIG. 3c is a variation of the embodiment of the invention shown in FIGS. 3a and 3b, wherein the carbide tip 45 is porous adjacent the cutting edge of the tool in order that the coolant can filter therethrough and reach the cutting edge.

Figure 4:
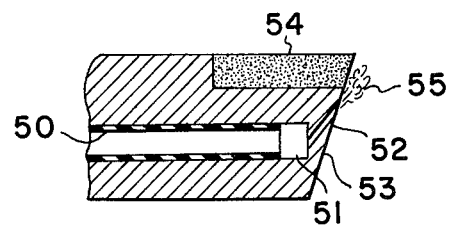
FIG. 4 is a partly sectional view of yet another embodiment of the tool according to the invention.

FIG. 4 shows another embodiment of the tool according to the invention wherein outer tubular structure 50 carries the coolant from the supply source. The inner tubular structure 50 terminates within the internal structure of the tool in a chamber 51. A small diameter drill hole 52 connects the chamber to the cutting edge 53 of the tool, a set distance below the carbide tip 54. The coolant is thus directed in a stream 55 toward the interface between the cutting edge of the tool and the workpiece in such a manner that the cutting chip from the workpiece does not interfere therewith. In the embodiments of the tool shown in FIGS. 3 and 4, insulation is also provided between the coolant and the internal structure of the tool as explained with reference to FIG. 2.

In all three embodiments of the invention shown in FIGS. 2–4, a stream of cryogenic coolant is routed internally of the tool and is directed at close range to the interface between the cutting edge of the machine tool and the workpiece. Applying the coolant at this point avoids interference by the cutting chips being removed as shown in FIG. 1. The coolant evaporates completely leaving no residue and effectively cools the cutting edge of the tool and provides a significantly higher cutting speed and increased tool life compared to conventional coolants, and provides a workpiece having improved finished characteristics compared to prior art techniques.

In the general case of cutting metals, the coolant should not boil until it is released at the cutting edge. This is achieved by minimizing the diameter of the inner tubular structures and proper insulation. Also the size of the releasing aperture or orifice which controls the amount of coolant released should be held to a minimum to maximize efficiency, consistent with the release of sufficient coolant proportional to the thermal buildup at the cutting edge of the tool. Typically a 0.010 diameter coolant release orifice would be sufficient for a cut of 0.010 feed, 0.125 deep, at a cutting speed of 80 or more feet-per-minute on a super alloy. Less coolant would be needed when machining softer metals. Various release orifice sizes may be used depending upon the speed of cut and toughness of the material being cut.

The invention may also be used to machine plastics to effect an acceptable level of thermal buildup in order to prevent the plastic from becoming pliable and warped. In machining plastics the amount of coolant applied to the tool cutting edge need not be as much as when machining metals; it may also be permitted to boil before release from the cutting edge. The FIG. 4 embodiment of the invention is particularly adapted to machining plastics.

What is claimed as new and desired to be secured by Letters Patent of the United States is:

1. In a tool for operating on a workpiece, wherein a coolant is applied to the interface between the tool cutting edge and workpiece, the improvement comprising:
- a source of cryogenic coolant; tool means;
- means internally defined by the tool means to carry the cryogenic coolant from the coolant source to the cutting edge of the tool means;
- said means having opening means at the region of the cutting edge of the tool means to direct a stream of the cryogenic coolant at the interface between the tool cutting edge and the workpiece in such a direction that the chip cutting from the workpiece does not interfere with the stream;
- and insulation means within the tool preventing the cryogenic coolant from boiling until it reaches the tool cutting edge to obtain maximum heat dissipation;
- said means internally defined by the tool comprising a bore with an interfitting tubular structure to carry the coolant from the coolant source to the cutting edge of the tool, wherein said tubular structure terminates inside the tool near the tool cutting edge and further comprising conduct means directed at a precise angle to carry the coolant from the termination of the interfitting tubular structure to the tool cutting edge.

2. In a tool for operating on a workpiece, wherein a coolant is applied to the interface between the tool cutting edge and workpiece, the improvement comprising:
- a source of cryogenic coolant; tool means;
- means internally defined by the tool means to carry the cryogenic coolant from the coolant source to the cutting edge of the tool means;
- said means having opening means at the region of the cutting edge of the tool means to direct a stream of the cryogenic coolant at the interface between the tool cutting edge and the workpiece in such a direction that the chip cutting from the workpiece does not interfere with the stream;
- and insulation means within the tool preventing the cryogenic coolant from boiling until it reach the tool cutting edge to obtain maximum heat dissipation;
- said means internally defined by the tool comprising a bore with an interfitting tubular structure to carry the coolant from the coolant source to the cutting edge of the tool, said tubular structure having a portion which extends a short distance beyond the tool cutting edge;
- said extension having an aperture therein precisely located to direct the coolant at the interface between the cutting tool edge and the workpiece, and said interfitting tubular structure being insulated from the tool by surrounding air space and insulation material to insure maintainence of coolant temperature until it is released to be directed at the interface between the tool cutting edge and the workpiece.

* * * * *